United States Patent [19]

Recker et al.

[11] 4,405,752

[45] Sep. 20, 1983

[54] PROCESS FOR PRODUCING FIBER-REINFORCED MOLDED PRODUCTS

[75] Inventors: Klaus Recker, Cologne; Gerd Reinecke, Bergisch-Gladbach; Albert Awater, Odenthal; Gerhard Grögler; Karl J. Kraft, both of Leverkusen, all of Fed. Rep. of Germany

[73] Assignee: Bayer Aktiengesellschaft, Leverkusen, Fed. Rep. of Germany

[21] Appl. No.: 192,389

[22] Filed: Sep. 30, 1980

[30] Foreign Application Priority Data

Oct. 10, 1979 [DE] Fed. Rep. of Germany ....... 2941051

[51] Int. Cl.$^3$ .............................................. C08L 75/04
[52] U.S. Cl. .................................... 524/847; 524/872; 524/875
[58] Field of Search ............... 524/791, 847, 871, 872, 524/873, 874, 875; 525/424, 440

[56] References Cited

U.S. PATENT DOCUMENTS

| 3,248,370 | 4/1966 | Reischl et al. | 260/75 |
| 3,271,352 | 9/1966 | Weinberg | 524/791 |
| 4,251,428 | 2/1981 | Recker et al. | 525/424 |
| 4,336,180 | 6/1982 | Recker et al. | 524/847 |

FOREIGN PATENT DOCUMENTS 573453 3/1976 Switzerland .

Primary Examiner—Lewis T. Jacobs
Attorney, Agent, or Firm—Gene Harsh; Joseph C. Gil; Richard A. Elder

[57] ABSTRACT

The instant invention is directed to a process for the production of fiber-reinforced molded products, comprising:

(1) mixing at a temperature of from 10° to 50° C.,
   (a) 7 to 35% by weight of a polyisocyanate having a melting point above 100° C., and
   (b) 14 to 35% by weight of a polyisocyanate which is liquid at the reaction temperature of mixing, with
   (c) 43 to 62% by weight of one or more compounds having molecular weights of 300 to 10,000 containing 2 to 8 hydroxyl groups, and
   (d) 3 to 10% by weight of a chain-lengthening agent having a molecular weight of 62 to 250 containing 2 to 4 hydroxyl groups,
   (e) 0 to 5% by weight of a compound having a molecular weight below 1,000 containing from 2 to 4 amino groups or an equivalent quantity of water,
   (f) 0 to 5% by weight of a molecular sieve of the sodium aluminum silicate type, and
   (g) 0 to 5% by weight of one or more activators, all percentages being based on the total weight of (a) through (g) and components (b) through (e) being liquid at the chosen reaction temperature of mixing and having an average functionality of isocyanate-reactive groups of 2.5 to 3.5, the equivalent ratio of isocyanate groups in component (b) to isocyanate-reactive hydrogen atoms in components (c) through (e) being from 0.4:1 to 0.85:1 and the equivalent ratio of isocyanate groups in component (a) to isocyanate-reactive hydrogen atoms in components (c) through (e), taking into account any masked isocyanate groups being from 0.15:1 to 1.2:1, with the proviso that the average functionality of components (c) through (e) should be at least 2.65 when the first-mentioned equivalent ratio is less than or equal to 0.65:1 and not more than 3.0 when the equivalent ratio is greater than or equal to 0.70:1;
(2) adding a fiber material having a fiber length of from 10 to 100 mm; and
(3) after storing for from one hour to four days, curing and shaping the molding compound at a temperature above 90° C. and at a pressure of from 20 to 300 bars.

10 Claims, No Drawings

PROCESS FOR PRODUCING FIBER-REINFORCED MOLDED PRODUCTS

BACKGROUND OF THE INVENTION

This invention relates to a process for the production of fiber-reinforced molded products based on polyurethanes.

In the present state of the art, fiber-reinforced molded products may be produced from many different synthetic polymers. Glass fibers have proved to be a particularly suitable reinforcing material. It is known, for example, to produce semifinished goods (resin mats "pre-pregs", molding materials) which are stable in storage from resins containing unsaturated polyesters (hereinafter referred to as "UP resins"). These substances may be shaped in heated presses and cured to form molded bodies with good strength and rigidity. However, this method has various disadvantages. The vinyl group-containing monomers (e.g. styrene) normally used as solvents for the UP resins cause a very high density of cross-linking in radical-initiated polymerization which, in turn, causes brittleness and sensitivity to notched impact in the molded product. The presence of solvents is an inconvenience in processing since it requires elaborate measures for removal of the solvent vapors by suction and the provision of processing plants which are protected against explosion.

To produce the semifinished product, the viscosity of the UP resin must be increased so that the reinforcing fibers will be transported without difficulty in the subsequent heating and pressing process. Small quantities of an alkaline earth metal oxide or hydroxide are usually added to the resin for this purpose. The addition of such a compound starts a lengthy ripening process which normally takes from 7 to 21 days and must be carried out at a slightly elevated temperature in so-called "ripening cupboards." This interim storage entails considerable expenditure in time and capital outlay and renders the process relatively uneconomical.

It is also known to use fiber materials to reinforce polyurethane elastomers. Glass fiber-reinforced polyurethane molded products, for example, may be produced by the injection molding or reaction injection molding process. The mechanical properties of these molded products, however, particularly the flexural strength thereof, may be only increased to a limited extent by this method since, for process technical reasons, the lengths of the fibers must not exceed from ca. 1 to 6 mm. It must be regarded as particularly disadvantageous that, due to the limited lengths of the fibers, the thermal coefficient of expansion of the reinforced polyurethane elastomers is still a multiple of the coefficient of expansion of steel.

A process for the production of high molecular weight cross-linked synthetic resins is described in German Pat. No. 968,566. In this process, an intermediate product is first produced from a hydroxyl polyester, a glycol and a subequivalent quantity of diisocyanate and this intermediate product is then reacted with an excess of a diisocyanate containing uretdione groups to produce a semifinished product which is stable in storage. The semifinished products obtained by this method may subsequently be subjected to a plastic shaping process and cured by the action of heat to produce elastic molded articles.

The polyurethane elastomers described in the aforesaid reference have a predominantly linear structure and, although they have a high elasticity and toughness, the hardness and rigidity thereof are insufficient for many purposes. The use of reinforcing material in the form of fibers is not mentioned in German Pat. No. 968,566. Although glass fibers longer than 6 mm could, in principle, be incorporated in the above-mentioned intermediate product, the high viscosity of the intermediate product would make it necessary to use rollers or a kneader of the type normally used for rubber processing in order to incorporate the fibrous material and the uretdione diisocyanate necessary for cross-linking. If such a method were used for incorporating the fibrous material, the shearing forces produced would be so high that the individual fibers would be broken down to fractions of the original length so that the desired effects of an increase in rigidity and a reduction in the coefficient of thermal expansion would no longer be obtained to the desired extent.

It is an object of the present invention to provide a process for producing fiber-reinforced molded products with good rigidity, impact strength and dimensional stability within economically acceptable periods of time, i.e., without prolonged interim storage of the intermediate product.

This problem is solved by the process according to the present invention.

DESCRIPTION OF THE INVENTION

The present invention relates to a process for the production of fiber-reinforced molded products, comprising:

(1) mixing at a temperature of from 10° to 50° C., preferably from 20° to 30° C.,
  (a) 7 to 35% by weight, preferably 10 to 30% of a polyisocyanate having a melting point above 100° C., preferably above 125° C., and
  (b) 14 to 35% by weight, preferably 17 to 28% of a polyisocyanate which is liquid at the reaction temperature of mixing with
  (c) 43 to 62% by weight, preferably 48 to 57% of one or more compounds having a molecular weight of 300 to 10,000, preferably 350 to 8,000, which contain 2 to 8, preferably 2 to 4, most preferably 2 or 3, hydroxyl groups, component (c) preferably being a mixture of:
    (ca) 20 to 60% by weight, preferably 25 to 50% of a polyol having a molecular weight of 1,000 to 10,000, preferably 2,000 to 8,000 and
    (cb) 1 to 30% by weight, preferably 2.5 to 25% by weight, of a polyol having a molecular weight of 300 to 950, preferably 350 to 800, and
  (d) 3 to 10% by weight, preferably 5 to 8% of a chain-lengthening agent containing 2 to 4, preferably 2 or 3, hydroxyl groups and having a molecular weight of 62 to 250, preferably 76 to 150, and
  (e) 0 to 5% by weight of a compound containing 2 to 4, preferably 2, amino groups and having a molecular weight below 1,000, preferably below 200, or an equivalent quantity of water, and
  (f) 0 to 5% by weight of a sodium aluminum silicate type of molecular sieve, and
  (g) 0 to 5% by weight of one or more activators,
    all percentages being based on the total weight of (a) through (g) and mixing optionally being carried out step-wise, and components (b)

through (e) being liquid at the selected reaction temperature of mixing and having an average functionality of isocyanate-reactive groups of 2.5 to 3.5, the equivalent ratio of isocyanate groups in component (b) to isocyanate-reactive hydrogen atoms in components (c) through (e) being 0.4:1 to 0.85:1, preferably 0.5:1 to 0.8:1, most preferably 0.6:1 to 0.7:1 and the equivalent ratio of isocyanate groups in component (a) to isocyanate-reactive hydrogen atoms in components (c) through (e), including any masked isocyanate groups, being 0.15:1 to 1.2:1, preferably 0.2:1 to 0.8:1, most preferably 0.3:1 to 0.5:1, with the proviso that the average functionality of components (c) through (e) should be at least 2.65 if the first-mentioned equivalent ratio $\leq 0.65:1$ and not more than 3.0 if the equivalent ratio $\geq 0.70:1$;

(2) adding a fibrous material having a fiber length of from 10 to 100 mm, preferably from 20 to 60 mm; and (3) after storing for from one hour to four days, curing and shaping the molding compound at a temperature above 90° C., preferably from 110° to 150° C., and at a pressure of from 20 to 300 bars.

Component (a) used in the preparation of the molding compound may be any polyisocyanates (preferably diisocyanates) having a melting point above 100° C., preferably from 125° to 200° C. Examples of these high-melting polyisocyanates of type (a) include, inter alia, 1,4-dichloro-2,5-diisocyanatobenzene; 1-chloro-4-methoxy-2,5-diisocyanatobenzene; 1,3-dimethoxy-4,6-diisocyanatobenzene; 2,5,2',5'-tetramethyl-4,4'-diisocyanatodiphenyl methane; diphenyl sulfone-4,4'-diisocyanate; naphthylene-1,5-diisocyanate and the urea diisocyanate obtained from 1 mol of water and 2 mol of 2,4-tolylene diisocyanate (German Offenlegungsschrift 2,902,469). The last three diisocyanates are preferred.

Among the solid, high melting polyisocyanates used according to the present invention, diisocyanates containing one or more uretdione groups, such as the compounds obtained by the known dimerization or oligodimerization of polyisocyanates used in polyurethane chemistry such as the uretdione-dimers or oligomers of diphenyl-methane-4,4'-diisocyanate or its -2,4'-isomer, are preferred. Dimeric 2,4-tolylene diisocyanate is particularly preferred.

The high melting polyisocyanate is preferably reduced to a particle size below 40μ before ists use.

As component (b) known polyisocyanates which are liquid in the system at the reaction temperature of mixing, which is up to 50° C., preferably at room temperature, may, in principle, be used as the isocyanate component.

The melting points of these low melting component (b)-polyisocyanates are preferably 50° C. or less. These include aliphatic, cycloaliphatic, araliphatic, aromatic and heterocyclic polyisocyanates described, for example, by W. Siefken in Justus Liebigs Annalen der Chemie, 562, pages 75 to 136, for example those corresponding to the general formula:

Q(NCO)

wherein n represents 2–4, preferably 2, and

Q represents an aliphatic hydrocarbon group having from 2 to 18, preferably from 6 to 10, carbon atoms, a cycloaliphatic hydrocarbon group having from 4 to 15, preferably from 5 to 10, carbon atoms, an aromatic hydrocarbon group having from 6 to 15, preferably from 6 to 13, carbon atoms, or an araliphatic hydrocarbon group having from 8 to 15, preferably from 8 to 13, carbon atoms.

Examples include ethylene diisocyanate; 1,4-tetramethylene diisocyanate; 1,6-hexamethylene diisocyanate; 1,12-dodecane diisocyanate; cyclobutane-1,3-diisocyanate; 1-isocyanato-3,3,5-trimethyl-5-isocyanatomethyl cyclohexane (German Auslegeschrift No. 1,202,785 and U.S. Pat. No. 3,401,190); 2,4- and 2,6-hexahydrotolylene diisocyanate and mixtures of these isomers; hexahydro-1,3- and/or 1,4-phenylene diisocyanate; perhydro-2,4'- and/or 4,4'-diphenylmethane diisocyanate; 2,4- and 2,6-tolylene diisocyanate and mixtures of these isomers; and diphenylmethane-2,4'- and/or -4,4'-diisocyanate.

The following may also be used according to the present invention: triphenylmethane-4,4',4''-triisocyanate; polyphenyl-polymethylene polyisocyanates obtained by aniline/formaldehyde condensation followed by phosgenation (British Pat. Nos. 874,430 and 848,671); m- and p-isocyanatophenyl sulfonyl isocyanates (U.S. Pat. No. 3,454,606); perchlorinated aryl polyisocyanates (German Auslegeschrift 1,157,601 or U.S. Pat. No. 3,277,138); polyisocyanates having carbodiimide groups (German Pat. No. 1,092,007, U.S. Pat. No. 3,152,162 and German Offenlegungsschriften Nos. 2,504,400; 2,537,685 and 2,552,350); norbornane diisocyanates (U.S. Pat. No. 3,492,330); polyisocyanates having allophanate groups (British Pat. No. 994,890, Belgian Pat. No. 761,626 and Netherlands Patent Application No. 7,102,524); polyisocyanates having isocyanurate groups (U.S. Pat. No. 3,001,973, German Pat. Nos. 1,022,789; 1,222,067 and 1,027,394 and German Offenlegungsschriften 1,929,034 and 2,004,048); polyisocyanates having urethane groups (Belgian Patent 752,261 and U.S. Pat. Nos. 3,394,164 and 3,644,457); polyisocyanates having acylated urea groups (German Pat. No. 1,230,778); polyisocyanates having biuret groups (U.S. Pat. Nos. 3,124,605 and 3,201,372 and British Pat. No. 889,050); polyisocyanates prepared by telomerization reaction (U.S. Pat. No. 3,644,106); polyisocyanates having ester groups (British Pat. Nos. 965,474 and 1,072,956, U.S. Pat. No. 3,567,763 and German Pat. No. 1,231,688); reaction products of the above-mentioned isocyanates with acetals (German Pat. No. 1,072,385) and polyisocyanates containing polymeric fatty acid esters (U.S. Pat. No. 3,455,883).

The distillation residues still containing isocyanate groups from the commercial production of isocyanates may also be used, optionally dissolved in one or more of the above-mentioned polyisocyanates. Mixtures of the above-mentioned polyisocyanates may, of course, also be used.

It is generally preferred to use commercially readily avialable polyisocyanates such as 2,4- and 2,6-tolylene diisocyanate and mixtures of these isomers ("TDI"); polyphenyl-polymethylene polyisocyanates obtained by aniline/formaldehyde condensation followed by phosgenation ("crude MDI"); and polyisocyanates containing carbodiimide groups, urethane groups, allophanate groups, isocyanurate groups, urea groups or biuret groups ("modified polyisocyanates") particularly those derived from 2,4- and/or 2,6-tolylene diisocyanate or from 4,4'- and/or 2,4'-diphenylmethane diisocyanate. Polyphenyl-polymethylene polyisocyanates which are liquid at room temperature are particularly preferred.

The invention is characterized by using the two different types of polyisocyanates, that means: high-melting polyisocyanates typs (a) and low melting polyisocyanates type (b).

Components (c) used for the synthesis of the hydroxyl prepolymer comprises compounds containing from 2 to 8 hydroxyl groups and having a molecular weight of from 300 to 10,000 which are liquid at the reaction temperature, preferably at temperatures below 30° C. They preferably comprise a mixture of polyols having molecular weights of from 1,000 to 10,000 or from 300 to 950. Preferred components (ca) are polyols having molecular weights of from 2,000 to 8,000, particularly from 3,000 to 6,000, and preferred components (cb) are polyols having molecular weights of from 350 to 800, in particular from 400 to 600. Examples include polyesters, polyethers, polythioethers, polyacetals, polycarbonates and polyester amides having, in each case, from 2 to 8, preferably from 2 to 4, hydroxyl groups.

Suitable polyesters having hydroxyl groups include, e.g. reaction products of polyhydric (preferably dihydric) alcohols, optionally with the addition of trihydric alcohols; and polybasic (preferably dibasic) carboxylic acids. Instead of free polycarboxylic acids, the corresponding polycarboxylic acid anhydrides or corresponding polycarboxylic acid esters of lower alcohols or mixtures thereof may be used for preparing the polyesters. The polycarboxylic acids may be aliphatic, cycloaliphatic, aromatic and/or heterocyclic. They may be substituted, e.g. by halogen atoms, and/or may be unsaturated.

The following are mentioned as examples of such carboxylic acids and derivatives thereof: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid ahydride, endomethylene tetrahydrophthalic acid ahydride, glutaric acid anhydride, maleic acid, maleic acid anhydride, fumaric acid, dimerized and trimerized unsaturated fatty acids (optionally mixed with monomeric unsaturated fatty acids, such as oleic acid), dimethyl terephthalate and terephthalic acid-bis-glycol esters. The following are examples of suitable polyhydric alcohols, ethylene glycol, propylene glycol-(1,2) and -(1,3), butylene glycol-(1,4) and -(2,3), hexanediol-(1,6), octanediol-(1,8), neopentylglycol, 1,4-bis-hydroxymethylcyclohexane, 2-methyl-1,3-propanediol, glycerol, trimethylolpropane, hexanetriol-(1,2,6), butanetriol-(1,2,4), trimethylolethane, pentaerythritol, quinitol, mannitol, sorbitol, formitol, methyl glycoside, diethylene glycol, triethylene glycol, tetraethylene glycol and higher polyethylene glycols, dipropylene glycol and higher polypropylene glycols, and dibutylene glycol and higher polybutylene glycols. The polyesters may also contain a proportion of carboxyl end groups. Polyesters of lactones, such as ε-caprolactone, or of hydroxycarboxylic acids, such as ω-hydroxycaproic acid, may also be used.

The polyethers used according to the present invention should have at least 2, generally from 2 to 8, preferably 2 or 3, hydroxyl groups. They may be prepared by polymerization of epoxides, such as ethylene oxide, propylene oxide, butylene oxide, tetrahydrofuran, styrene oxide or epichlorohydrin. Each may be prepared on its own, e.g. in the presence of Lewis catalysts such as $BF_3$, or by addition of these epoxides, preferably ethylene oxide and propylene oxide. They may also be prepared as mixtures or successively to starting components having reactive hydrogen atoms such as water, ammonia, alcohols or amines. Examples of components having reactive hydrogen atoms include ethylene glycol, propylene glycol-(1,3) or -(1,2), trimethylolpropane, glycerol, sorbitol, 4,4'-dihydroxydiphenyl propane, aniline, ethanolamine or ethylene diamine. Sucrose polyethers may also be used according to the present invention (German Auslegeschriften 1,176,358 and 1,064,938). Polyethers started on formitol or formose (German Offenlegungsschriften Nos. 2,639,083 or 2,737,951) may also be used. It is, in many cases, preferred to use polyethers which contain predominantly primary OH groups (up to 90% by weight, based on all the OH groups present in the polyether). Polybutadienes which have OH groups may also be used according to the present invention.

Particularly to be mentioned among the polythioethers are the condensation products obtained by reacting thiodiglycol on its own and/or with other glycols, dicarboxylic acids, formaldehyde, aminocarboxylic acids or amino alcohols. The products obtained are polythio mixed ethers, polythio ether esters or polythio ester amides, depending on the components.

Suitable polyacetals include, for example, the compounds which may be prepared from the reaction of glycols (such as diethylene glycol, triethylene glycol, 4,4'-dioxethoxy-diphenyl dimethylmethane and hexanediol) with formaldehyde. Suitable polyacetals for the purposes of the present invention may also be prepared by the polymerization of cyclic acetals, e.g. trioxane (German Offenlegungsschrift 1,694,128).

The polycarbonates having hydroxyl groups which may be used include those which may be prepared by the reaction of diols (such as propanediol-(1,3), butanediol-(1,4) and/or hexanediol-(1,6), diethylene glycol, triethylene or tetraethylene glycol or thiodiglycol) with diaryl carbonates (e.g. diphenyl carbonate) or with phosgene (German Auslegeschriften Nos. 1,694,080; 1,915,908 and 2,221,751; German Offenlegungsschrift No. 2,605,024).

Suitable polyester amides and polyamides include, for example, the predominantly linear condensates prepared from polybasic saturated or unsaturated carboxylic acids or anhydrides thereof and polyfunctional saturated or unsaturated amino alcohols, diamines, higher polyamines and mixtures thereof.

Polyhydroxyl compounds already containing urethane or urea groups and modified or unmodified natural polyols such as castor oil or carbohydrates (e.g. starch) may also be used. Addition products of alkylene oxides and phenol/formaldehyde resins or urea/formaldehyde resins are also suitable for the purposes of the present invention.

The polyhydroxyl compounds mentioned above may be modified in various ways before they are used in the polyisocyanate polyaddition process. According to German Offenlegungsschriften No. 2,210,839 (U.S. Pat. No. 3,849,515) and 2,544,195, a mixture of various polyhydroxyl compounds (e.g. of a polyether polyol and a polyester polyol) may be condensed by etherification in the presence of a strong acid to produce a relatively high molecular weight polyol consisting of various segments linked by ether bridges. According to German Offenlegungsschrift No. 2,559,372, amide groups may be introduced into the polyhydroxyl compounds. According to German Offenlegungsschrift No. 2,620,487, triazine groups may be introduced by a reaction with polyfunctional cyanic acid esters.

Polyhydroxyl compounds which contain high molecular weight polyadducts or polycondensates or polymers in a finely dispersed or dissolved form may also be used according to the present invention. Such polyhydroxyl compounds may be obtained, for example, by carrying out polyaddition reactions (e.g. reactions between polyisocyanates and amino functional compounds) or polycondensation reactions (e.g. between formaldehyde and phenols and/or amines) in situ in the above-mentioned hydroxyl compounds. Processes of this type have been described in German Auslegeschriften Nos. 1,168,075 and 1,260,142 and in German Offenlegungsschriften Nos. 2,324,134; 2,423,984; 2,512,385; 2,513,815; 2,550,796; 2,550,797; 2,550,833; 2,550,862; 2,633,293 and 2,639,254. Alternatively, these polyhydroxyl compounds may be prepared by mixing a previously prepared aqueous polymer dispersion with a polyhydroxyl compound and then removing the water from the mixture (U.S. Pat. No. 3,869,413 or German Offenlegungsschrift 2,550,860).

Polyhydroxyl compounds which have been modified with vinyl polymers, e.g. the polyhydroxyl compounds obtained by the polymerization of styrene and acrylonitrile in the presence of polyethers (U.S. Pat. Nos. 3,383,351; 3,304,273; 3,523,093 and 3,110,695 and German Auslegeschrift No. 1,152,536) or in the presence of polycarbonate polyols (German Patent 1,769,795 and U.S. Pat. No. 3,637,909) are also suitable for the process according to the present invention. Synthetic resins having exceptionally high flame resistance are obtained by using polyether polyols which have been modified according to German Offenlegungsschriften Nos. 2,442,101; 2,644,922 and 2,646,141 by graft polymerization with vinyl phosphonic acid esters and optionally (meth)acrylonitrile, (meth)acrylamide or OH functional (meth)acrylic acid esters. Polyhydroxyl compounds which carboxyl groups have been introduced by radical graft polymerization with unsaturated carboxylic acids and optionally other olefinically unsaturated monomers (German Offenlegungsschriften Nos. 2,714,291; 2,739,620 and 2,654,746) are particularly advantageous to use in combination with mineral fillers.

When modified polyhydroxyl compounds of the type mentioned above are used as starting components in the polyisocyanate polyaddition process, the polyurethane resins obtained, in many cases, have substantially improved mechanical properties.

Representatives of the above-mentioned compounds to be used according to the present invention have been described in High Polymers, Volume XVI, "Polyurethanes: Chemistry and Technology" by Saunders-Frisch, Interscience Publishers, New York, London, Volume I, 1962, pages 32–42 and pages 44–54 and Volume II, 1964, pages 5–6 and 198–199; and in Kunststoff Handbuch, Volume VII, Vieweg Hochtlen, Carl Hanser Verlag, Munich 1966, e.g. on pages 45–71. The above-mentioned compounds containing at least two isocyanate-reactive hydrogen atoms and having molecular weights of from 300 to 10,000 may be used as mixtures, e.g. mixtures of polyethers and polyesters.

The following are examples of suitable low molecular weight chain-lengthening agents (d) for the preparation of the molding compound: ethylene glycol; propylene glycol-(1,2) and -(1,3); butylene glycol-(1,4) and -(2,3); pentanediol-(1,5); hexanediol-(1,6); octanediol-(1,8); neopentylglycol; 1,4-bishydroxymethyl-cyclohexane; 2-methyl-1,3-propanediol; dibromobutenediol (U.S. Patent 3,723,392); glycerol; trimethylolpropane; hexanetriol-(1,2,6); trimethylolethane; pentaerythritol; quinitol; mannitol; sorbitol; castor oil; diethylene glycol; triethylene glycol; tetraethylene glycol; higher polyethylene glycols having molecular weights up to 400; dipropylene glycol; higher polypropylene glycols having molecular weights up to 400; dibutylene glycol; higher polybutylene glycols having molecular weights up to 400; 4,4'-dihydroxy-diphenylpropane; dihydroxymethylhydroquinone; ethanolamine; diethanolamine; N-methyl diethanolamine; triethanolamine and 3-aminopropanol.

The low molecular weight polyols used according to the present invention may also be mixtures of hydroxy aldehydes and hydroxy ketones ("formoses") or the polyhydric alcohols obtained from them by reduction ("formitol"). These compounds are obtained by the autocondensation of formaldehyde hydrate in the presence of metal compounds as catalysts and in the presence of compounds capable of enediol formation as co-catalysts (German Offenlegungsschriften Nos. 2,639,084; 2,714,084; 2,714,104; 2,721,186; 2,738,154 and 2,738,512). To obtain synthetic resins having improved flame resistance, these formoses are advantageously used in combination with aminoplast formers and/or phosphites (German Offenlegungsschriften Nos. 2,738,513 and 2,738,532). Solutions of polyisocyanate polyaddition products, in particular of polyhydrazodicarbonamides and/or polyurethane ureas containing ionic groups, in low molecular weight polyhydric alcohols, may also be used as polyol components according to the present invention (German Offenlegungsschrift No. 2,638,759).

For some purposes, it is advantageous to use polyols containing sulfonate and/or phosphonate groups (German Offenlegungsschrift NO. 2,719,372), particularly the adduct of bisulfite to butenediol-(1,4) or its alkoxylation products.

The compounds having at least two amino groups used as optional component (e) for the preparation of the hydroxyl prepolymer may be aliphatic and/or aromatic diamines.

Suitable aliphatic diamines for the purposes of the present invention include ethylene diamine; 1,4-tetramethylene diamine; 1,11-undecamethylene diamine; 1,12-dodecamethylene diamine and mixtures of these amines; 1-amino-3,3,5-trimethyl-5-aminomethyl cyclohexane ("isophorone diamine"); 2,4- and 2,6-hexahydrotolylene diamine and mixtures thereof, perhydro-2,4'- and -4,4'-diamino-diphenylmethane; p-xylylene diamine; bis-(3-aminopropyl)-methylamine; diamino-perhydroanthracenes (German Offenlegungsschrift No. 2,638,731) and cycloaliphatic triamines (German Offenlegungsschrift No. 2,614,244). Hydrazine and substituted hydrazines, e.g. methyl hydrazine, N,N'-dimethyl hydrazine and homologues thereof and acid dihydrazides, may also be used according to the present invention. Examples include: carbodihydrazide; oxalic acid dihydrazide; the dihydrazides of malonic acid, succinic acid, glutaric acid, adipic acid, β-methyladipic acid, sebacic acid, hydracrylic acid and terephthalic acid; semicarbazido-alkylene hydrazides, e.g. β-semicarbazido-propionic acid hydrazide (German Offenlegungsschrift No. 1,770,591); semicarbazido-alkylene carbazic esters, e.g. 2-semicarbazidoethylcarbazic ester (German Offenlegungsschrift No. 1,918,504); and amino semicarbazide compounds such as β-aminoethyl-semicarbazido carbonate (German Offenlegungsschrift No. 1,902,931). The amino groups may be partly or completely blocked by aldimine or ketimine groups to control the reactivity thereof (U.S. Pat. No. 3,734,894 and German Offenlegungsschrift No. 2,637,115).

Examples of aromatic diamines include: bisanthranilic acid esters (German Offenlegungsschriften Nos. 2,040,644 and 2,160,590); 3,5- and 2,4-diaminobenzoic acid esters (German Offenlegungsschrift No. 2,025,900); the diamines having ester groups described in German Offenlegungsschriften No. 1,803,635 (U.S. Pat. Nos. 3,681,290 and 3,736,350); 2,040,650 and 2,160,589; the diamines having ether groups described in German Offenlegungsschriften Nos. 1,770,525 and 1,809,172 (U.S. Pat. Nos. 3,654,364 and 3,736,295); 2-halogen-1,3-phenylene diamines optionally substituted in the 5-position (German Offenlegungsschriften No. 2,001,772; 2,025,896 and 2,065,869); 3,3'-dichloro-4,4'-diamino-diphenylmethane; tolylene diamine; 4,4'-diamino-diphenylmethane; 4,4'-diamino-diphenyldisulfides (German Offenlegungsschrift No. 2,404,976); diamino-diphenyl dithioethers (German Offenlegungsschrift No. 2,509,404); aromatic diamines substituted with alkyl thio groups (German Offenlegungsschrift No. 2,638,760); diaminobenzene phosphonic acid esters (German Offenlegungsschrift No. 2,459,491); aromatic diamines containing sulfonate or carboxylate groups (German Offenlegungsschrift No. 2,720,166) and the high melting diamines mentioned in German Offenlegungsschrift No. 2,635,400. The aminoalkyl thio anilines according to German Offenlegungsschrift No. 2,734,574 are examples of aliphatic-aromatic diamines.

Sodium aluminosilicates used according to the present invention may be, for example, the zeolites available commercially as molecular sieves.

Activators suitable for the purposes of the present invention include tertiary amines such as triethylamine; tributylamine; N-methyl morpholine; N-ethyl morpholine; N,N,N',N'-tetramethyl-ethylene diamine; pentamethyl-diethylene triamine and higher homologues (German Offenlegungsschriften Nos. 2,624,527 and 2,624,528); 1,4-diazobicyclo-(2,2,2)-octane; N-methyl-N'-dimethyl aminoethyl piperazine; bis(dimethylaminoalkyl)-piperazines (German Offenlegungsschrift No. 2,636,787); N,N-dimethylbenzylamine; N,N-dimethyl cyclohexylamine; N,N-diethylbenzylamine; bis-(N,N-diethylamino ethyl)-adipate; N,N,N',N'-tetramethyl-1,3-butane diamine; N,N-dimethyl-β-phenyl ethylamine; 1,2-dimethyl imidazole; 2-methyl imidazole; monocyclic and bicyclic amidines (German Offenlegungsschrift No. 1,720,633); bis-(dialkylamino)alkyl ethers (U.S. Pat. No. 3,330,782, German Auslegeschrift No. 1,030,558 and German Offenlegungsschriften Nos. 1,804,361 and 2,618,280); and tertiary amines containing amide groups (preferably formamide groups) according to German Offenlegungsschriften Nos. 2,523,633 and 2,732,292). The Mannich bases of secondary amines (such as dimethylamine) and aldehydes (preferably formaldehyde) or ketones (such as acetone, methyl ethyl ketone or cyclohexanone) and phenols (such as phenol, nonylphenol or bisphenol) may also be used as catalysts.

Tertiary amines having isocyanate-reactive hydrogen atoms which may be used as catalysts include triethanolamine; triisopropanolamine; N-methyldiethanolamine; N-ethyl-diethanolamine; N,N-dimethylethanolamine; reaction products thereof with alkylene oxides (such as propylene oxide and/or ethylene oxide) and secondary tertiary amines according to German Offenlegungsschrift No. 2,732,292.

Silaamines having carbon-silicon bonds such as the compounds described in German Pat. No. 1,229,290 (U.S. Pat. No. 3,620,984) may also be used as catalysts, for example, 2,2,4-trimethyl-2-silamorpholine and 1,3-diethylaminomethyl-tetramethyl-disiloxane.

Basic nitrogen compounds (such as tetraalkyl ammonium hydroxides), alkali metal hydroxides (such as sodium hydroxide), alkali metal phenolates (such as sodium phenolate), and alkali metal alcoholates (such as sodium methylate) may also be used as catalysts. Hexahydrotriazines are also suitable (German Offenlegungsschrift No. 1,769,043).

The reaction between isocyanate groups and Zerewitinoff-active hydrogen atoms is strongly accelerated by lactams and azalactams, an associate being first formed between the lactam and the compound containing acidic hydrogen. Associates of this type and the catalytic acitivity thereof are described in German Offenlegungsschriften Nos. 2,062,288; 2,062,289; 2,117,576 (U.S. Pat. Nos. 3,758,444); 2,129,198; 2,330,175 and 2,330,211.

Organo-metallic compounds may also be used as catalysts according to the present invention, in particular organo-tin compounds. Apart from tin compounds containing sulfur such as di-n-octyl-tin mercaptide (German Auslegeschrift No. 1,769,367 or U.S. Pat. No. 3,645,927), the organo-tin compounds used are preferably tin(II) salts of carboxylic acids such as tin(II) acetate, tin(II) octoate, tin(II) ethylhexoate and tin(II) laurate, and the tin(IV) compounds. Specific examples include dibutyl tin oxide, dibutyl tin dichloride, dibutyl tin diacetate, dibutyl tin dilaurate, dibutyl tin maleate or dioctyl tin diacetate.

The above-mentioned catalysts may, of course, be used as mixtures. It is particularly desirable to use combinations of organo-metallic compounds with amidines, aminopyridines or hydrazinopyridines (German Offenlegungsschriften Nos. 2,434,185; 2,601,082 and 2,603,834).

Other representatives of catalysts which may be used according to the present invention and the activity of these catalysts have been described in Kunststoff Handbuch, Volume VII, published by Vieweg Hochtlen, Carl Hanser Verlag, Munich 1966, e.g. on pages 96 to 102.

Other additives which may be used according to the present invention include: reaction retarders (e.g. substances which are acidic in reaction such as hydrochloric acid or organic acid halides), pigments, dyes, flame retarding agents (e.g. tris-chloroethyl phosphate, tricresyl phosphate and ammonium phosphate and polyphosphate), stabilizers against aging and weathering, plasticizers, fungistatic and bacteriostatic substances and fillers (such as barium sulfate, kieselguhr, carbon black or whiting).

Other examples of additives which may be used according to the present invention and details concerning the use and mode of action of these additives may be found in Kunststoff Handbuch, Volume VII, published by Vieweg Hochtlen, Carl Hanser Verlag, Munich 1966, e.g. on pages 103 to 113.

The fiber materials used may be inorganic and/or organic fibrous reinforcing materials. Examples include glass fibers (preferably in lengths of from 20 to 60 mm), graphite fibers, asbestos fibers or fiber materials obtained from orgnic polymers (e.g. from a polyester, a polyethylene terephthalate or a polyamide such as polyhexamethylene adipamide or polycaprolactam). These fiber materials may be in the form of textiles, nonwoven webs, tapes, cables, continuous filament fibers or chopped staple fibers. It is particularly suitable for the purposes of the present invention to use glass fibers treated in known manner with sizes which confer on the fibers an affinity for polyurethanes (German Auslegeschriften Nos. 2,426,657 and 2,426,654).

The quantity of fibrous material to be incorporated depends on the required improvement in mechanical properties of the molded product. The material is generally incorporated in quantities of from 5 to 60% by weight, based on the total weight of fiber-reinforced substance.

Other additives may be used in addition to the fiber materials, as mentioned above. These may include, for example, particulate fillers such as chalk, carbon black, clay, iron oxide, mica, materials containing silicates, titanium dioxide, color pigments, lubricants and mold release agents (such as Zn-stearate, UV absorbents and the like).

Method of carrying out the process according to the present invention

Component (a) is preferably suspended in component (b) but may also be made up into a paste with the mixture of components (c) through (e), optionally together with a molecular sieve and activator, before component (b) is added. (It is preferred, however, to add the activator at as late a stage as possible so that the reaction will not proceed too rapidly). The equivalent ratio of component (b) to the sum of components (c) through (e) and the average functionality of components (c) through (e) in their isocyanate-reactive groups are dependent upon each other. A relatively high degree of branching requires only relatively little preliminary lengthening of the polyol mixture with isocyanate (amounting to the same as a low equivalent ratio) in order to impart to the molding compound a suitable viscosity for subsequent processing. Conversely, a low degree of branching must be compensated by a higher equivalent ratio. As a general rule, an equivalent ratio of $\leq 0.65:1$ requires an average functionality $\geq 2.65$; while an equivalent ratio of $\geq 0.70:1$ requires an average functionality $\leq 3.0$. The polyaddition reaction between the H-acidic compounds and the polyisocyanate (b) which is in the liquid phase is started by mixing the suspension of component (a) in component (b) with the mixture of the other components or by mixing the suspension of component (a) in the mixture of components (c) through (e), optionally containing molecular sieve and activator with component (b).

Since the reaction mixture has a relatively low viscosity, the fibrous materials may be incorporated by the conventional methods used for UP resins. The ripening time until the molding compound reaches a consistency suitable for molding varies from half an hour to two days according to the temperature, quantity of activator and choice of raw materials. After four days at the most, the molding compounds must be shaped by the action of temperatures above 90° C., preferably from 110° to 150° C., at pressures of from ca. 20 to 300 bars preferably 20 to 150 bars, and then cured within from ca. 1 to 10 minutes. The molded products obtained have a relativey high flexural strength combined with good impact strength and tear propagation resistance.

The following Examples illustrate the present invention. Quantities are to be understood as parts by weight or percentages by weight unless otherwise indicated.

EXAMPLES

EXAMPLE 1

Component I 50 parts of a branched chain polypropylene glycol having primary OH end groups (molecular weight 4,800; functionality=3) [component (ca)], 40 parts of a branched chain polypropylene glycol (molecular weight 450; functionality=3) [component (cb)], 10 parts of triethanolamine [component (d)], 5 parts of a 50% paste of sodium aluminum silicate [component (f)] in a partially branched polypropylene glycol (molecular weight 3700; functionality=2.75) [component (ca)], 2 parts of polypropylene glycol adipate (molecular weight 820; functionality=2) [component (cb)], 100 parts of calcium carbonate (chalk) and 1 part of lead salt of phenyl-ethyl-dithiocarbamic acid [component (g)].

Average functionality of the compounds of component I containing isocyanate-reactive groups: 2.99.

Component II 34.1 parts of a commercial diphenylmethane diisocyanate mixture (isocyanate content: 31%) consisting of 65% 4,4'-diphenylmethane diisocyanate, 20% 2,4'-diphenylmethane diisocyanate and 15% multinuclear polyphenyl polymethylene polyisocyanates [component (b)]. Equivalent ratio II/I=0.5:1.

Component III 35.3 parts of dimeric 2,4-tolylene diisocyanate [component (a)].

Component IV 120 parts of glass rovings of a commercial fiber having a diameter of 11 μm sized according to Example 1 of German Ausleschrift No. 2,426,657 and cut to a length of 52 mm.

Production of the Fiber-reinforced Molded Product

Components I, II and III are first homogeneously mixed in the given proportions in a suitable dosing and mixing apparatus. The reactive mass is spread out on a polyethylene foil to form a layer 1 to 2 mm in thickness, using a coating knife. The pot life or time available for spreading with the coater is approximately two minutes.

The glass rovings cut to a length of 52 mm are then scattered over this layer and covered with a second layer of the mixture of I, II and III which has also been applied to a polyethylene foil with a coating knife. Ridged pressure rollers are then applied to ensure complete penetration of the glass fibers by the mixture. The polyethylene foil may be stripped off the resin mat obtained after half an hour.

To produce molded products, after storage of at least 1 hour, parts are cut out of the mat according to the required shape and molded under a pressure of 75 bars at 120° C. The product is cured for from 3 to 10 minutes, depending on the thickness of the layer. The shaped product may then be removed from the mold while still hot. If desired, several layers may be introduced into the mold one above the other since the layers of material flow into one another homogeneously during the molding process. Transport of the glass fibers to the outermost corners of the molded article is ensured even if comparatively long flow paths must be traversed.

The stability of the molding compound in storage is only a few hours at room temperature. The time available for processing may be increased by storing the mass at lower temperatures.

The following properties were determined on cured test plates produced as described above:

|  | Without glass fiber | With glass fiber |  |
|---|---|---|---|
| Density according to DIN 53 479 | 1.41 | 1.65 | Mg/m³ |
| Tensile strength according to DIN 53 504 | 22.3 | 132.5 | MPa |
| Elongation on tearing according to DIN 53 504 | 49 | 4.0 | % |
| Bending modulus according to ASTM D 790-71 | 450 | 8200 | MPa |
| Coefficient of increase in length according to VDE 0304/Part 1 | 340 | 10 10⁻⁶ | degree⁻¹ |

EXAMPLE 2

Component I
  70 parts of a branched chain polypropylene glycol having primary OH end groups (molecular weight 6,000; functionality=3) [component(ca)],
  30 parts of a branched chain polypropylene glycol (molecular weight 450; functionality=3) [component (cb)],
  5 parts of 1,4-butanediol [component (d)],
  5 parts of trimethylolpropane [component (d)],
  5 parts of sodium aluminum silicate [component (f)] as a 50% paste in a partially branched polypropylene glycol (molecular weight 3,700; functionality=2.75) [component (ca)],
  2 parts of polypropylene glycol adipate (molecular weight 820) [component (cb)],
  100 parts of calcium carbonate (chalk),
  1 part of diethyl-tolylene diamine [component (e)],
  and 1 part of lead salt of phenyl-ethyl-dithiocarbamic acid [component (g)].

Average functionality of compounds of component I containing isocyanate-reactive groups: 2.65.

Component II
  42.9 parts of commercial diphenylmethane diisocyanate mixture from Example 1, equivalent ratio II-/I=0.67:1 [component (b)], and
  23.7 parts of dimeric 2,4-tolylene diisocyanate [component (a)].

Component III
  80 parts of glass rovings from Example 1.

The formulation is processed in the same manner as described in Example 1. The molding compound may be processed after 24 hours.

| Test Results | Without glass fiber | With glass fiber |  |
|---|---|---|---|
| Density according to DIN 53 479 | 1.38 | 1.52 | Mg/m³ |
| Tensile strength according to DIN 53 504 | 12.9 | 37.7 | MPa |
| Elongation on tearing according to DIN 53 504 | 72 | 11.2 | % |
| Tear propagation resistance according to DIN 53 515 | 55 | 275 | KN/m |
| Bending modulus according to ASTM D 790-71 | 300 | 1800 | MPa |
| Cold impact strength at −30° C. according to DIN 53 453 | — | 80 | KJ/m² |

What is claimed is:

1. A process for the production of fiber-reinforced molded products, comprising:
   (1) mixing at a temperature of from 10° to 50° C.,
      (a) 7 to 35% by weight of a polyisocyanate having a melting point above 100° C., and
      (b) 14 to 35% by weight of a polyisocyanate which is liquid at the reaction temperature of mixing with
      (c) 43 to 62% by weight of one or more compounds having molecular weights of 300 to 10,000 containing 2 to 8 hydroxyl groups, and
      (d) 3 to 10% by weight of a chain-lengthening agent having a molecular weight of 62 to 250 containing 2 to 4 hydroxyl groups,
      (e) 0 to 5% by weight of a compound having a molecular weight below 1,000 containing from 2 to 4 amino groups or an equivalent quantity of water,
      (f) 0 to 5% by weight of a molecular sieve of the sodium aluminum silicate type, and
      (g) 0 to 5% by weight of one or more activators, all percentages being based on the total weight of (a) through (g), and components (b) through (e) being liquid at the chosen reaction temperature of mixing and having an average functionality of isocyanate-reactive groups of 2.5 to 3.5, the equivalent ratio of isocyanate groups in component (b) to isocyanate-reactive hydrogen atoms in components (c) through (e) being from 0.4:1 to 0.85:1 and the equivalent ratio of isocyanate groups in component (a) to isocyanate-reactive hydrogen atoms in components (c) through (e), taking into account any masked isocyanate groups being from 0.15:1 to 1.2:1, with the proviso that the average functionality of components (c) through (e) should be at least 2.65 when the first-mentioned equivalent ratio is less than or equal to 0.65:1 and not more than 3.0 when the equivalent ratio is greater than or equal to 0.70:1;
   (2) adding a fiber material having a fiber length of from 10 to 100 mm; and
   (3) after storing for from one hour to four days, curing and shaping the molding compound at a temperature above 90° C. and at a pressure of from 20 to 300 bars.

2. The process of claim 1 wherein said component (c) is a mixture of
   (ca) 20 to 60% by weight of a polyol having a molecular weight of 1,000 to 10,000, and
   (cb) 1 to 30% by weight of a polyol having a molecular weight of from 300 to 950.

3. The process of claim 2 wherein said component (c) is a mixture of
   (ca) 25 to 50% by weight of a polyol having a molecular weight of 2,000 to 8,000, and
   (cb) 2.5 to 25% by weight of a polyol having a molecular weight of from 350 to 800.

4. The process of claim 1 wherein said component (c) is a compound or compounds having from 2 to 4 hydroxyl groups.

5. The process of claim 4 wherein said component (c) is a compound or compounds having 2 to 3 hydroxyl groups.

6. The process of claim 1 wherein said component (a) is from 10 to 30% by weight of a polyisocyanate having a melting point above 125° C.

7. The process of claim 1 wherein said component (b) is 17 to 28% by weight of a polyisocyanate which is liquid at room temperature.

8. The process of claim 1 wherein said component (d) is 5 to 8% by weight of a compound having a molecular weight of 76 to 150 and having 2 or 3 hydroxyl groups.

9. The process of claim 1 wherein the equivalent ratio of isocyanate groups in component (b) to isocyanate-reactive hydrogen atoms in components (c) through (e) is from 0.5:1 to 0.8:1 and the equivalent ratio of isocyanate groups in component (a) to isocyanate-reactive hydrogen atoms in components (c) through (e), taking into account any masked isocyanate groups, is from 0.2:1 to 0.8:1.

10. The process of claim 1 wherein said fiber materials are glass fibers having a length of from 20 to 60 mm.

* * * * *